(12) United States Patent
Mothaffar (10) Patent No.: US 9,615,160 B1
(45) Date of Patent: Apr. 4, 2017

(54) EARPHONE SYSTEM WITH RETRACTABLE CABLES (71) Applicant: Hussain Younes Mothaffar, Safat (KW)

(72) Inventor: Hussain Younes Mothaffar, Safat (KW)

( * ) Notice: Subject to any disclaimer, the term of this patent is extended or adjusted under 35 U.S.C. 154(b) by 0 days.

(21) Appl. No.: 15/276,656

(22) Filed: Sep. 26, 2016

(51) Int. Cl.
H04R 1/10 (2006.01)
B65H 75/40 (2006.01)
B65H 75/44 (2006.01)
H04W 4/00 (2009.01)

(52) U.S. Cl.
CPC ......... *H04R 1/1033* (2013.01); *B65H 75/406* (2013.01); *B65H 75/4431* (2013.01); *H04R 1/1041* (2013.01); *B65H 2701/34* (2013.01); *H04R 2420/07* (2013.01); *H04W 4/008* (2013.01)

(58) Field of Classification Search
CPC .. B65H 75/34; B65H 75/406; B65H 75/4431; B65H 2701/34; H02G 11/02; H04R 5/033; H04R 1/1033; H04R 1/1041; H04R 2420/07; H04W 4/008
USPC ........................................................ 381/384
See application file for complete search history.

(56) References Cited

U.S. PATENT DOCUMENTS

| 6,434,249 | B1 | 8/2002 | Wei | |
| D705,421 | S | 5/2014 | Eisenmenger | |
| 8,774,443 | B1 * | 7/2014 | Anderson | B65H 75/4431 242/378.4 |
| 8,811,646 | B1 * | 8/2014 | Romeo | H04R 1/1033 381/370 |
| 9,167,330 | B1 * | 10/2015 | Shattuck | H04R 1/1033 |
| 2006/0205441 | A1 * | 9/2006 | Matsuda | A45F 5/00 455/569.1 |
| 2008/0075315 | A1 | 3/2008 | Yu | |

(Continued)

FOREIGN PATENT DOCUMENTS

KR 20140036498 A * 3/2014 ............... H04R 1/10

OTHER PUBLICATIONS

ReTrak Emerge Retractable Stereo Earbuds, Assorted Colors https://www.walmart.com/search/?query=retractable%20earbuds &typeahead=retractable , retrieved from the Internet on Aug. 11, 2016.

*Primary Examiner* — Davetta W Goins
*Assistant Examiner* — Oyesola C Ojo
(74) *Attorney, Agent, or Firm* — Richard C. Litman (57) ABSTRACT The earphone system with retractable cables includes a Y-shaped housing including a first earphone, a first cable winding take-up reel, a first cable connected to the first earphone and the first take-up reel, a second earphone, a second cable winding take-up reel, a second cable connected to the second earphone and the second cable winding take-up reel, a plug-in connector, a third cable winding take-up reel, and a third cable connected to the plug-in connector and the third cable winding take-up reel. The three take-up reels are disposed non-coaxially in the housing, for independently spooling the respective first cable, second cable, and third cable. The housing can include a Bluetooth module and a microphone. The third cable can be electrically connected to the earbuds and the microphone to carry audio signals to and from the earphone system when the plug-in connector is plugged into a mobile device.

7 Claims, 9 Drawing Sheets (56) References Cited

U.S. PATENT DOCUMENTS

| | | | |
|---|---|---|---|
| 2008/0080732 A1* | 4/2008 | Sneed | H04R 1/1033 381/374 |
| 2009/0017877 A1 | 1/2009 | Lin | |
| 2010/0193221 A1* | 8/2010 | Schoeffmann | H04R 1/1033 174/135 |
| 2012/0153065 A1* | 6/2012 | Fischer | B65H 75/4431 242/379 |
| 2012/0300970 A1 | 11/2012 | Pröll | |
| 2012/0314896 A1 | 12/2012 | Bryant | |
| 2013/0001346 A1* | 1/2013 | Cheng | H04R 1/1033 242/378.1 |
| 2013/0058516 A1* | 3/2013 | Sullivan | H04R 1/1033 381/380 |
| 2013/0238829 A1 | 9/2013 | Laycock et al. | |
| 2014/128128 A1 | 5/2014 | Bunton | |
| 2014/0355779 A1* | 12/2014 | Pusey | H04R 1/1033 381/74 |
| 2015/0086062 A1* | 3/2015 | Schrems | H04M 1/15 381/384 |

\* cited by examiner

FIG. 10
*Actual size*

EARPHONE SYSTEM WITH RETRACTABLE CABLES

BACKGROUND OF THE INVENTION

1. Field of the Invention

The present invention relates to headsets and earbuds, and particularly to an earphone system with independently retractable cables for the left earbud, right earbud, and plug.

2. Description of the Related Art

Earphones or headsets for consumer electronic devices are typically attached to a cord or cable for connecting the earphones to an electronic device, such as a mobile phone. Oftentimes, however, the cord becomes entangled between the earphones and the terminal device. In addition, it is difficult to store conventional headsets in a manner which does not result in tangling or destruction of the cord.

Thus, an earphone system with retractable cables solving the aforementioned problems is desired.

SUMMARY OF THE INVENTION

The earphone system with retractable cables includes a first earphone, a first cable winding take-up reel, a first cable connected to the first earphone and the first cable winding take-up reel, a second earphone, a second cable winding take-up reel, a second cable connected to the second earphone and the second cable winding take-up reel, a plug-in connector, a third cable winding take-up reel, a third cable connected to the plug-in connector and the third cable winding take-up reel, and a Y-shaped housing. The three take-up reels are disposed non-coaxially in the housing, for independently spooling the respective first cable, second cable, and third cable. The housing can further include a Bluetooth module and a microphone. The third cable can be electrically connected to the earbuds and the microphone to carry audio signals to and from the earphone system when the plug-in connector is plugged into an electronic device.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

FIGS. 1 through 11 show an earphone system with retractable cables and/or components thereof. The earphone system with retractable cables 100 includes a left earphone or earbud 102a, a first cable connected to the left earbud 102a, a right earphone or earbud 102b, a second cable connected to the right earbud 102b, a plug-in connector 116, a third cable connected to the plug-in connector, and a Y shaped housing 133. The earbuds 102a, 102b and the plug-in connector 116 are fully and independently retractable into the Y shaped housing 133. The first cable and the second cable are connected to the third cable. The first cable, the second cable, and the third cable can be independent spooled up by spring loaded take-up reels 106a, 106b, and 108, respectively. Each of the spring loaded take-up reels 106a, 106b, and 108 include a respective spring biased take-up reel locking mechanism 154. As described in detail below, the spring biased take-up reel locking mechanism 154 can be released manually by pressing release button 152, release button 156, or release button 157.

Figure 3:
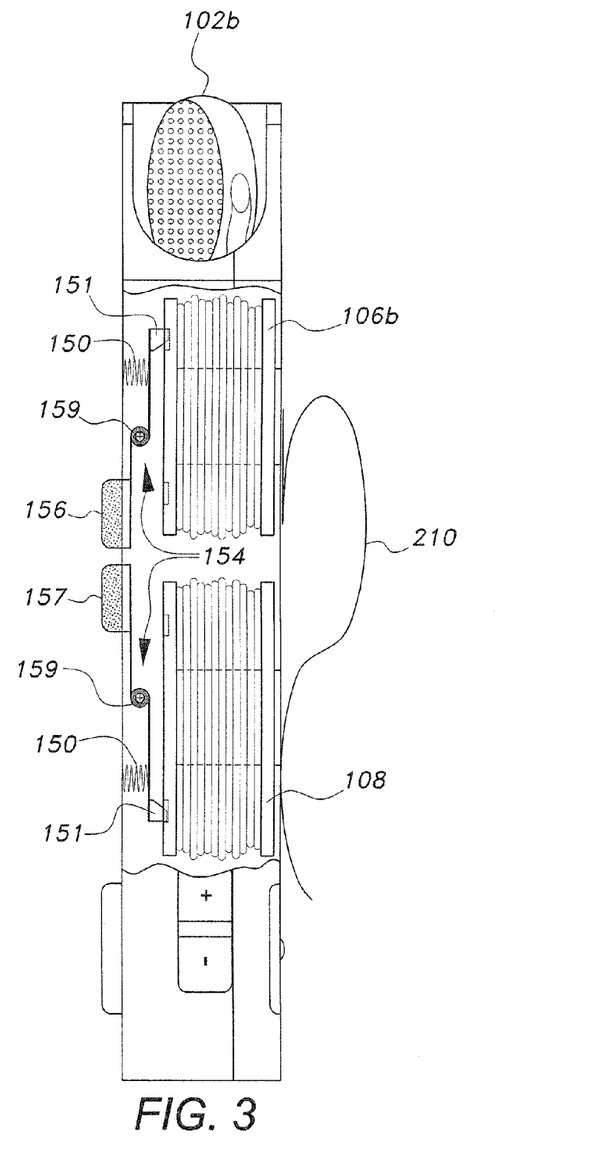
FIG. 3 is a left side view partially cutaway to illustrate the take-up reels of the earphone system with retractable cables according to the present invention.

As shown more clearly in FIG. 3, each take-up reel locking mechanism 154 includes a coil spring 150 that biases opposing ends of a pivoting arm 159. Accordingly, the opposing ends of the pivoting arm 159 can be alternately raised and lowered. For example, the first end of the arm 159 can be in a raised position while the second end is in a lowered positioned, and vice versa. The first end of the arm 159 can have a protrusion 151 that contacts the take-up reel to lock the reel in place. The second end of the arm 159 is in communication with a push button 156 on the housing 133. The spring loaded take-up reels 106a, 106b are disposed in the housing 133 in non-coaxial relation to each other.

As shown in FIG. 3, a user pushing the button 156 counteracts the bias of coil spring 150 to lift the first end of arm 159 away from contact with the take-up reel 106b thereby allowing the take-up reel 106b to spool the cable and retract the attached earbud 102b into a user desired length or completely into recess 104b in the housing 133. Take-up reels 106a and 108 are spooled/de-spooled in similar fashion using their respective pushbuttons 152 and 157 (see FIG. 8). It should be understood that the cable unwinding procedure can be accomplished by pushing the buttons and pulling on the appropriate cable/attached earbud or plug-in connector.

Figure 1:
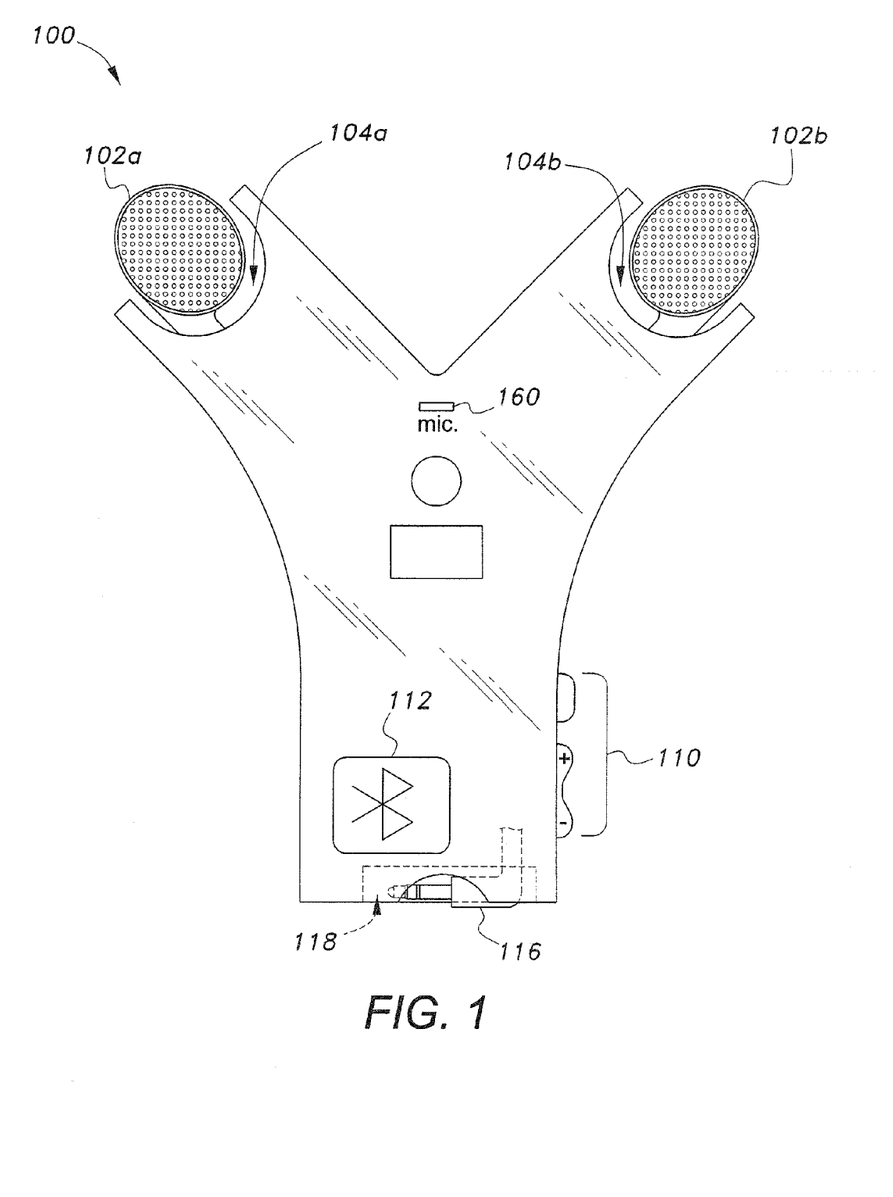
FIG. 1 is a front view of the earphone system with retractable cables according to the present invention.

The earbuds 102a, 102b and plug-in connector 116 are independently positioned in separate portions of the Y shaped housing 133 when not in use. The earbuds 102a, 102b fit into recesses 104a and 104b, respectively, in opposing upper arms of the Y shaped housing 133. The plug-in connector 116 retracts into recess 118 in the lower arm portion of the Y shaped housing 133. As shown in FIG. 1, a microphone 160 can be disposed on the Y shaped housing near a longitudinal centerline of the Y shaped housing 133.

Figure 2:
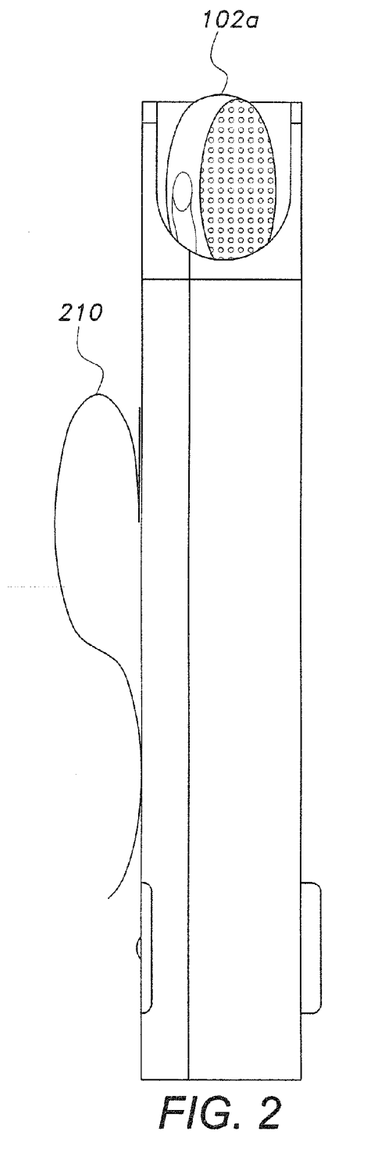
FIG. 2 is a right side view of the earphone system with retractable cables according to the present invention.
Figure 4:
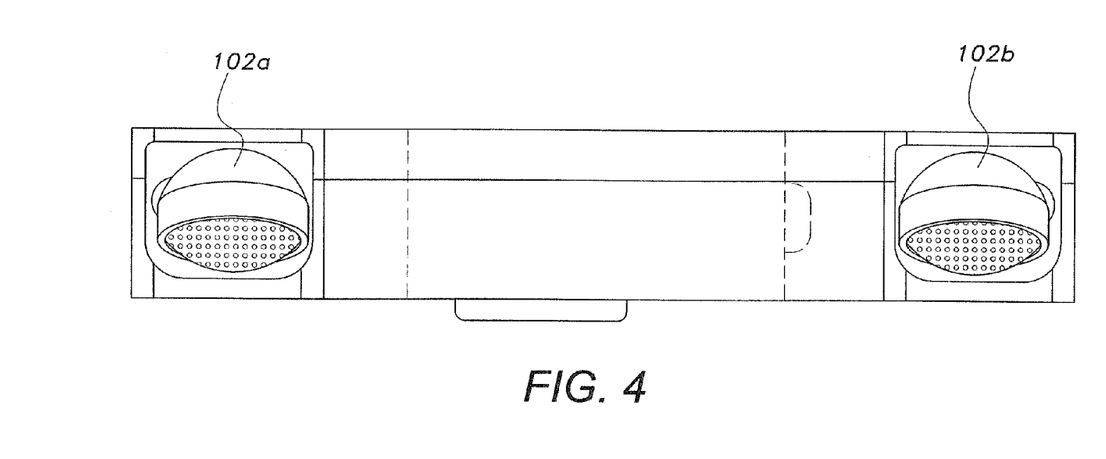
FIG. 4 is a top view of the earphone system with retractable cables according to the present invention.
Figure 5:
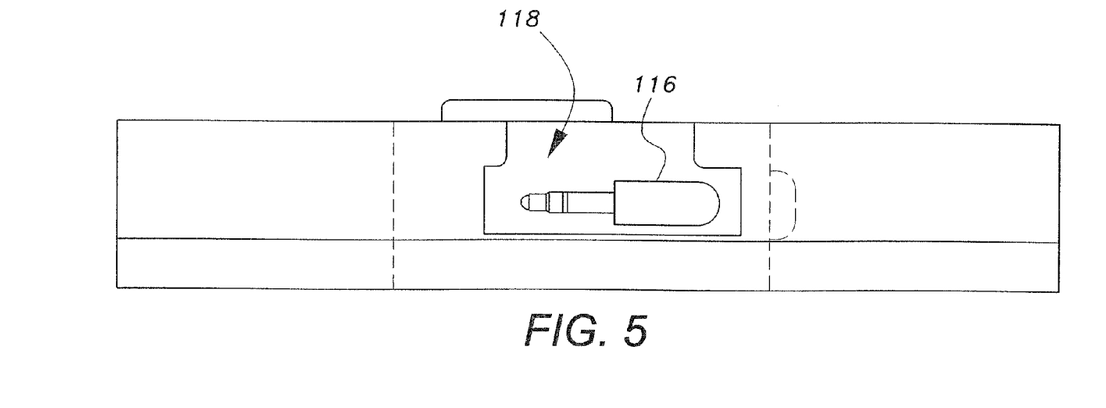
FIG. 5 is a bottom view of the earphone system with retractable cables according to the present invention.
Figure 6:
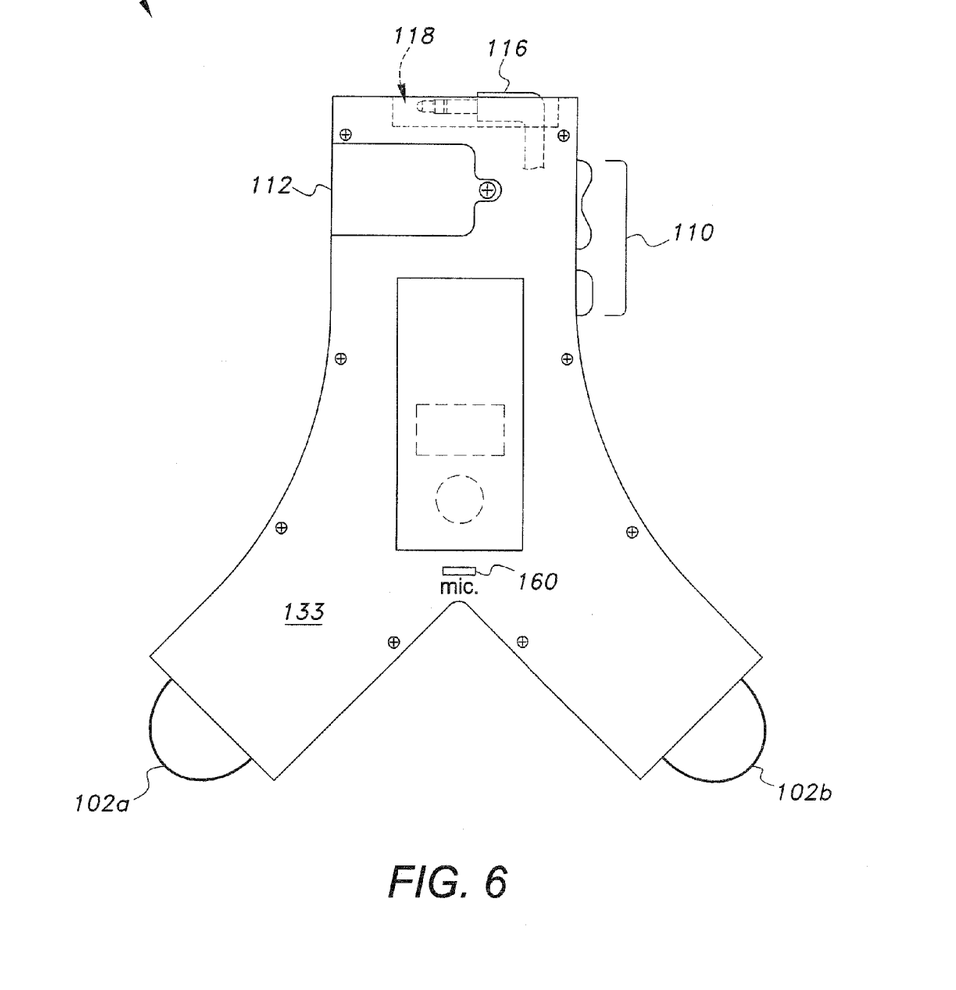
FIG. 6 is a rear view of the earphone system with retractable cables according to the present invention.
Figure 7:
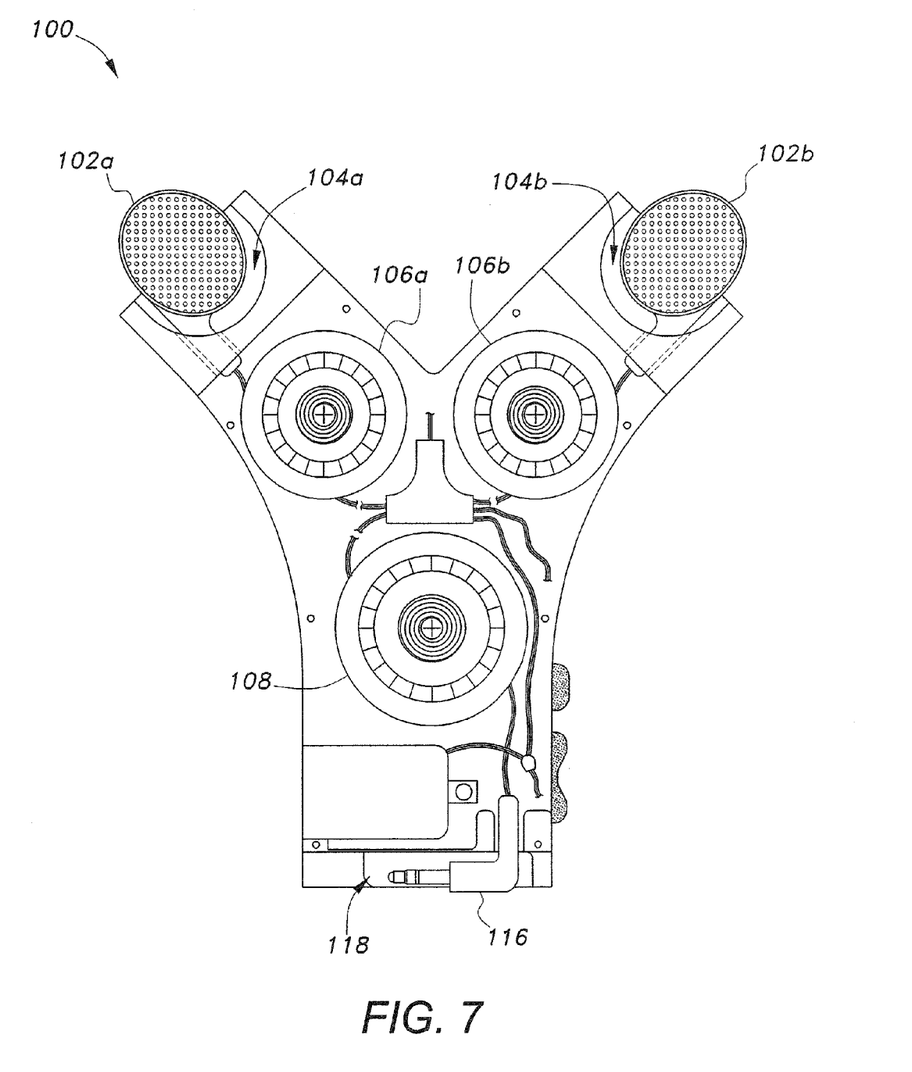
FIG. 7 is a front view partially cutaway to illustrate the take-up reels of the earphone system with retractable cables according to the present invention.
Figure 8:
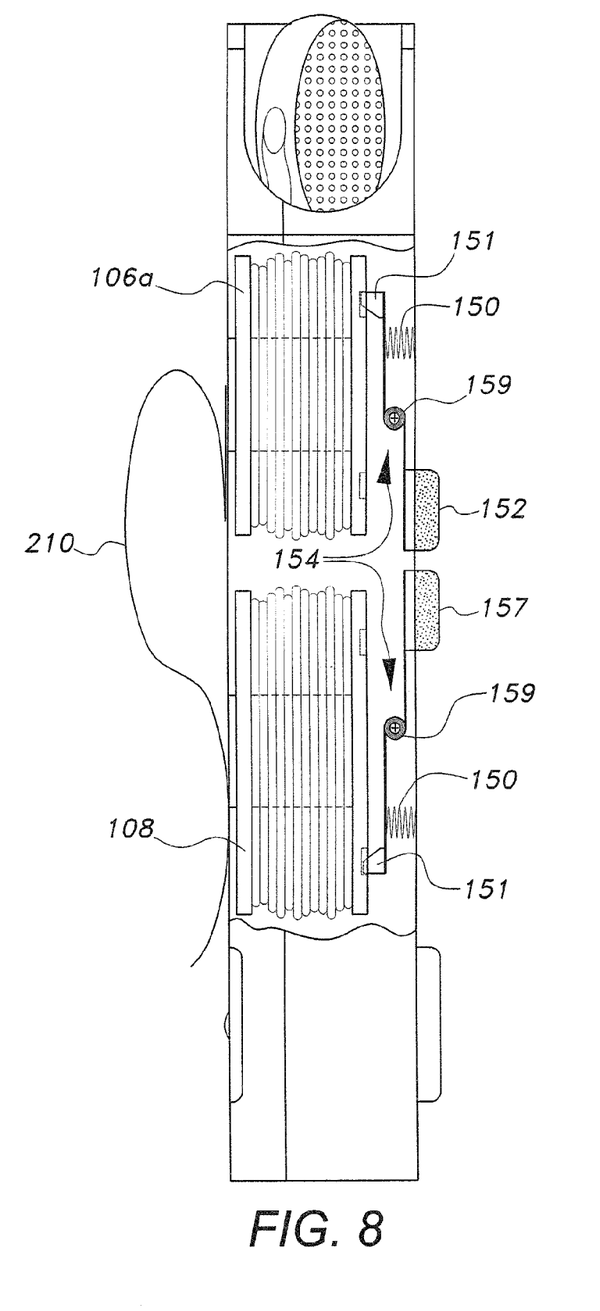
FIG. 8 is a side view partially cutaway to illustrate the take-up reels and locking mechanism of the earphone system with retractable cables according to the present invention.
Figure 9:
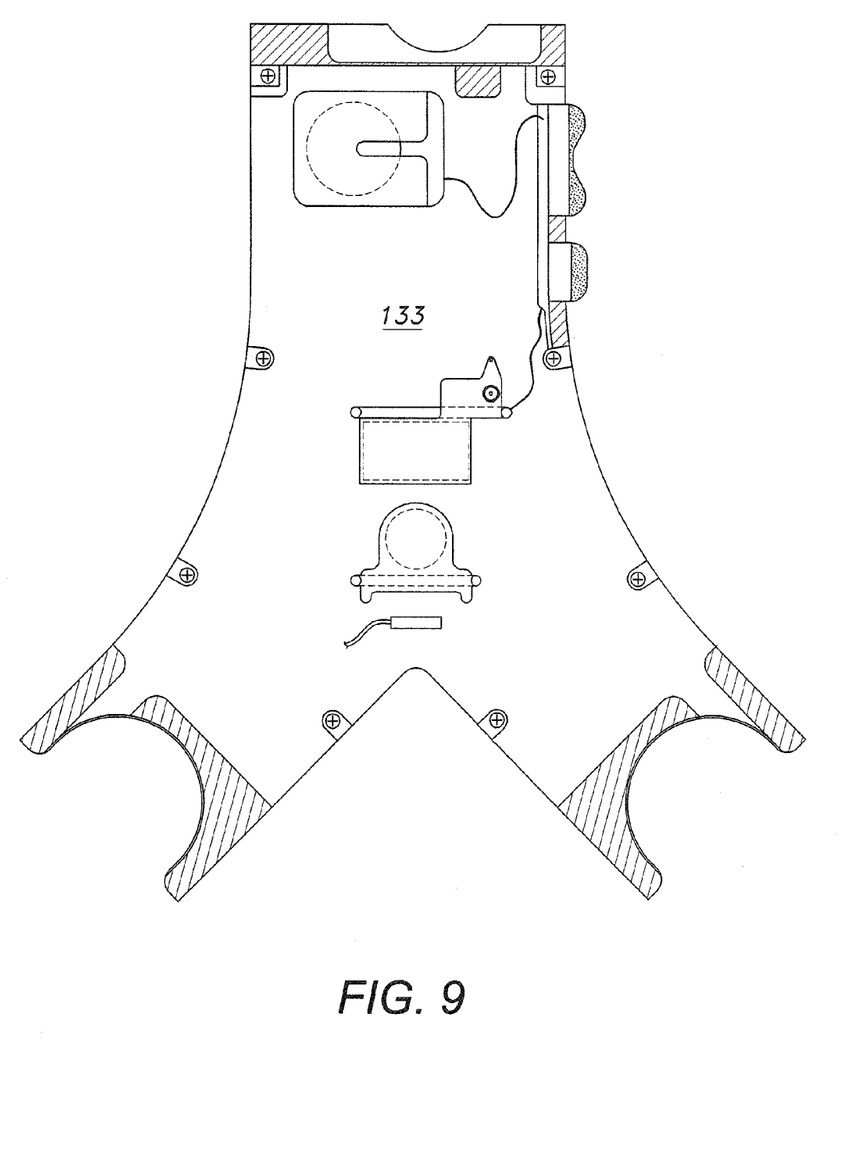
FIG. 9 is a front view of the earphone system with retractable cables according to the present invention without the attached earbuds and plug-in connector.
Figure 10:
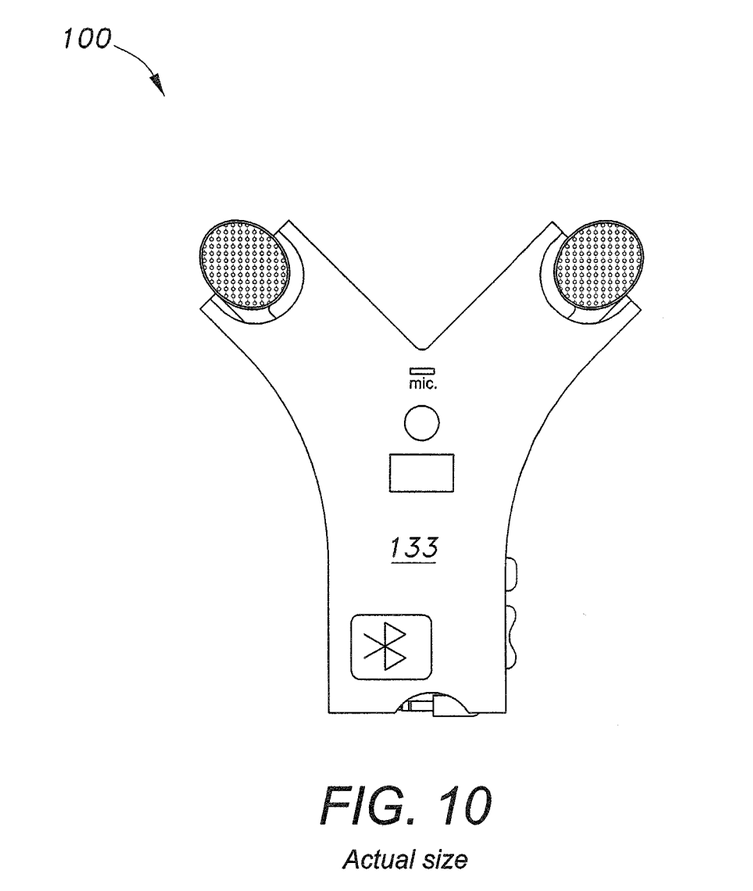
FIG. 10 is a front view of the earphone system with retractable cables according to the present invention.
Figure 11:
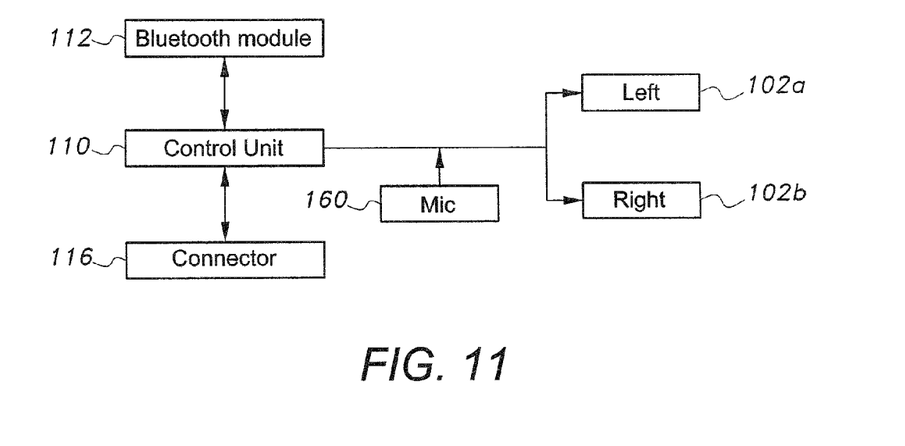
FIG. 11 is a block diagram circuit of the earphone system with retractable cables according to the present invention.

As shown in FIGS. 2 and 3, an attachment clip 210 can be disposed on an outer surface of the housing 133 so that the housing 133 can be clipped to apparel worn by a user. The manner in which the earbuds 102a and 102b fit in the housing is shown in FIG. 4. The manner that plug-in connector 116 fits into recess 118 of the housing is shown in FIG. 5. FIG. 6 illustrates how the microphone 160 can be disposed at a point (apex of the Y shape) on the housing 133 that positions the microphone close to a user's mouth when the earbuds 102a and 102b are placed in a user's ear. FIG. 9 illustrates the housing 133 without the attached earbuds and plug-in connector. FIG. 10 illustrates the actual size of earphone system 100 according to an embodiment.

The earphone system 100 can include a control unit 110 (shown in the block diagram of FIG. 11) for allowing a user to control the volume, microphone, and other features. The control unit 110 is electrically connected to connector 116, to the earbuds 102a, 102b, to the microphone 160, and/or additional buttons on the housing, e.g., a button to allow wired/wireless control of the earphone system 100, including on/off control of a Bluetooth adapter 112. The Bluetooth adapter can allow wireless operation of the earphone system 100 in conjunction with a connected external device such as a mobile phone, media player, or the like. As shown in FIG. 1, the control unit 110 includes "+/−" controls and a power switch. The control unit 110 can be in communication with a "stop/play" button and/or "answer/end call" button of the attached electronic device. The microphone and the earbuds can be electrically connected to the Bluetooth module. The plug-in connector cable can be electrically connected to the earbuds and the microphone to carry audio signals to and from the earphone system when the plug-in connector is plugged into the mobile device.

It is to be understood that the present invention is not limited to the embodiments described above, but encompasses any and all embodiments within the scope of the following claims.

I claim:

1. An earphone system with retractable cables, comprising: a generally Y-shaped housing having a first upper arm, a second upper arm spaced from the first upper arm to define the upper segment of the Y-shaped housing, and a lower arm joined to the first and second upper arms, wherein each of the first and second upper arms has a recess portion at its terminal end; a left earbud connected to a first cable, at least a portion of the first cable within a first passageway in the first upper arm, wherein the left earbud is disposed in the first upper arm recess when the left earbud cable is totally retracted into the housing via the first passageway; a right earbud connected to a second cable, at least a portion of the second cable within a second passageway in the second upper arm, wherein the right earbud is disposed in the second upper arm recess when the right earbud cable is totally retracted into the housing via the second passageway; a plug-in connector connected to a third cable, at least a portion of the third cable within the lower arm; a first take-up reel in the housing and in communication with the first cable, the first take-up reel configured for independently spooling and de-spooling the first cable; a second take-up reel in the housing and in communication with the second cable, the second take-up reel configured for independently spooling and de-spooling the second cable; a third take-up reel in the housing and in communication with the third cable, the third take-up reel configured for independently spooling and de-spooling the third cable; means for independently locking the first and second take-up reels after the user has paid out a desired length of cable extending from the first and second take-up reels; and means for independently releasing the first and second take-up reels to allow the user to payout or retract the cables spooled by the first and second take-up reels.

2. The earphone system with retractable cables according to claim 1, further comprising:
means for locking the third take-up reel after the user has paid out a desired length of plug-in connector cable extending from the third take-up reel; and
means for releasing the third take-up reel to allow the user to payout or retract the plug-in connector cable spooled by the third take-up reel.

3. The earphone system with retractable cables according to claim 1, further comprising a microphone disposed on the housing.

4. The earphone system with retractable cables according to claim 1, wherein the plug-in connector is disposed in the lower arm of the housing when the plug-in connector cable is totally retracted into the housing.

5. The earphone system with retractable cables according to claim 1, further comprising a wireless adapter disposed in the housing for wireless operation of the earphone system in conjunction with a connected external device.

6. The earphone system with retractable cables according to claim 1, further comprising:
a first pushbutton protruding from the housing;
a first pivoting arm disposed in the housing, the first pivoting arm having opposing first and second ends;
a first coil spring disposed in the housing and biasing the opposing ends of the first pivoting arm to alternately raise and lower the first and second ends of the arm, the first end of the arm having a protrusion that selectively contacts the first take-up reel to lock the reel in place, the second end of the arm selectively contacting the first push button to lock or release the first take-up reel; and
a second pushbutton protruding from the housing;
a second pivoting arm disposed in the housing, the second pivoting arm having opposing first and second ends;
a second coil spring disposed in the housing and biasing the opposing ends of the second pivoting arm to alternately raise and lower the first and second ends of the arm, the first end of the arm having a protrusion that selectively contacts the second take-up reel to lock the reel in place, the second end of the arm selectively contacting the second push button to lock or release the second take-up reel.

7. The earphone system with retractable cables according to claim 6, further comprising:
a third push button protruding from the housing;
a third pivoting arm disposed in the housing, the third pivoting arm having opposing first and second ends;
a third coil spring disposed in the housing and biasing the opposing ends of the third pivoting arm to alternately raise and lower the first and second ends of the arm, the first end of the arm having a protrusion that selectively contacts the third take-up reel to lock the reel in place, the second end of the arm selectively contacting the third push button to lock or release the third take-up reel.

* * * * *